United States Patent
Xu et al.

(10) Patent No.: US 6,909,690 B1
(45) Date of Patent: Jun. 21, 2005

(54) CALL ADMISSION CONTROL IN TELECOMMUNICATION NETWORKS

(75) Inventors: Mao Xu, Overland Park, KS (US); Shannon P. Silvus, Penfield, NY (US); Xiaojun Shen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/483,476

(22) Filed: Jan. 14, 2000

(51) Int. Cl.$^7$ ................................................. H04L 1/00
(52) U.S. Cl. .................... 370/230; 370/395.64; 370/468
(58) Field of Search .......................... 370/230, 230.1, 370/231, 232, 235, 252, 395.1, 395.2, 395.21, 395.6, 395.61, 395.64, 532, 902

(56) References Cited

U.S. PATENT DOCUMENTS

| | | | | |
|---|---|---|---|---|
| 5,897,613 A | * | 4/1999 | Chan ......................... | 704/210 |
| 6,169,738 B1 | * | 1/2001 | Sriram et al. .......... | 370/395.21 |
| 6,233,223 B1 | * | 5/2001 | Sabry et al. ................ | 370/230 |
| 6,600,720 B1 | * | 7/2003 | Gvozdanovic .............. | 370/230 |

OTHER PUBLICATIONS

Sriram et al, Voice over ATM Using AAL2 and Bit Dropping: Performance and Call Admission Control, IEEE, pp. 18–28, 1999.*

Baldwin et al, AAL–2–A New ATM Adaptation Layer for Small Packet Encapsulation and Multiplexing, Bell Labs Technical Journal, pp. 111–131, 1997.*

McLoughlin et al, Adapting Voice For ATM Networks: An AAL2 Tutorial, General DataComm, pp. 1–13, 1997.*

Paul T. Brady, "A Statistical Analysis of On–Off Patterns in 16 Conversations," The Bell System Technical Journal, American Telephone and Telegraph Company (New York), p. 73–91, (Jan. 11, 1968).

Paul T. Brady, "A Techniquie for Investigating On–Off Patterns of Speech," The Bell System Technical Journal, American Telephone and Telegraph Company (New York), vol. XLIV (No. 1), p. 1–22, (Jan. 11, 1965).

Harry Heffes and David M. Lucantoni, "A Markov Modulated Characterization of Packetized Vocie and Data Traffic and Related Statistical Multiplexer Performance," IEEE Journal on Selected Areas in Communications, IEEE, vol. SAC–4 (No. 6), p. 856–867, (Sep. 11, 1986).

Kotikalapudi Sriram and Ward Whitt, "Characterizing Superposition Arrival Processes in Packet Multiplexers for Voice and Data," IEEE Journal on Selected Areas in Communications, IEEE, vol. SAC–4 (No. 6), p. 833–846, (Sep. 11, 1986).

Basil Maglaris, Dimitris Anastassiou, Prodip Sen, Gunnar Karlsson, and John D. Robbins, "Performace Models of Statistical Multiplexing in Packet Video Communications," IEEE Transactions on Communications, IEEE, vol. 36 (No. 7), p. 834–843, (Jul. 11, 1988).

K. Sriram and Y.T. Wang, "Voice Over ATM Using AAL2 and Bit Dropping: Performance and Call Admission Control," p. 1–25.

H. Schulzrinne, et al., "RTP: A Transport Protocol for Real–Time Applications," p. 1–75, (Jan. 1996).

* cited by examiner

Primary Examiner—Frank Duong

(57) ABSTRACT

A communication hub that controls access to a communication network over a communication path based on silence suppression. The communication hub comprises a silence suppression block, a call admission block, and a control system. The silence suppression block is configured to compute a silence suppression gain for an incoming call based on a silence suppression realized for the incoming call and a number of currently active calls. The call admission block is configured to control access to a communication network over a communication path based on the silence suppression gain for the incoming call. The control system is configured to determine a call type of the incoming call and control the silence suppression block and the call admission block.

42 Claims, 3 Drawing Sheets

CALL ADMISSION CONTROL IN TELECOMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a communication hub that controls access to a communication network based on silence suppression.

2. Description of the Prior Art

Advanced communication networks are being developed to support a vast array of communication services. One example of an advanced communication network is a packet network. In a typical packet network, a communication hub located on a subscriber's premise and connected to one or multiple user devices exchanges communications with the network over a communication path. The communication path between the communication hub and the network typically includes a fixed bandwidth capacity agreed to between the customer and the service provider.

In one example of a call scenario using a packet network, a connection request is received in the communication hub from a user device. The communication hub suppresses, compresses, and packetizes the incoming digital signals from the user device for transmission to the network. At the network level, the network determines whether or not to allow the connection request using call admission control. Call admission control is the set of actions taken by the network during the call setup phase to accept or reject the connection request. For example, if the effective bandwidth for the connection request is greater than the provisioned bandwidth capacity purchased by the customer, the network will reject the call using call admission control. The effective bandwidth is the minimum bandwidth that needs to be allocated to meet the performance requirements for the currently active calls and the incoming connection request. If the connection request can be processed without violating the provisioned bandwidth, then the call is admitted.

To improve bandwidth efficiency the network uses silence suppression technology to fill silence periods in voice conversation packets with other call transmissions such as data, video, and imaging. A silence suppression gain factor is used to determine the required bandwidth for voice calls based on the silence suppression realized by filling the silence periods with other transmissions. The silence suppression gain factor is a constant based on a statistical calculation of the silence suppression realized for the large number of active voice calls present at any given time at the network level. The constant silence suppression gain factor is applied to incoming voice calls to determine the effective bandwidth for the currently active calls in conjunction with the incoming voice call.

To improve efficiency and reduce the demand on network resources, it is desired in the art to perform call admission control at the hub level and to use silence suppression technology to improve bandwidth efficiency between the communication hub and the network. Unfortunately, communication hubs cannot use a constant silence suppression gain factor. The constant silence suppression gain factor, while effective at the network level where large volumes of voice calls are present, is inaccurate at the hub level where only a small volume of voice calls may be present.

SUMMARY OF THE INVENTION

The present invention advances the art by providing a communication hub configured to perform call admission control over a communication path to the network based on silence suppression. Advantageously, the communication hub controls access in real-time to the communication network based on a silence suppression gain realized for an incoming call based on the silence suppression realized for the incoming call and a number of currently active calls. The access decision is based on a comparison of the provisioned bandwidth for the communication path and the effective bandwidth required to accommodate the incoming call and the currently active calls. The effective bandwidth required is based on a calculation of the silence suppression gain relative to the number of currently active calls.

The communication hub is comprised of a silence suppression block, a call admission block, a control system, and an interface system. The silence suppression block is configured to compute the silence suppression gain for an incoming call based on the silence suppression realized for the incoming call and the number of currently active calls. The call admission. block is configured to control access to the communication network over the communication path based on the silence suppression gain for the incoming call. The control system is configured to determine the type of the incoming call and control the silence suppression block and the call admission block. The interface system is configured to receive the incoming call and exchange call traffic with the communication network over the communication path.

A first advantage of the present invention is that the call admission control features are active when a new call session is requested and when a call session is released. Thus, the provisioned bandwidth for a communication path is protected from violating the desired quality of service. A second advantage of the present invention is that the computation of the silence suppression gain for individual calls relative to the number of currently active calls increases utilization efficiency for the communication path. A third advantage of the present invention is that congestion is reduced without resorting to packet dropping or cell dropping at the network level.

DETAILED DESCRIPTION OF THE PREFERRED EMBODIMENT

Figure 1:
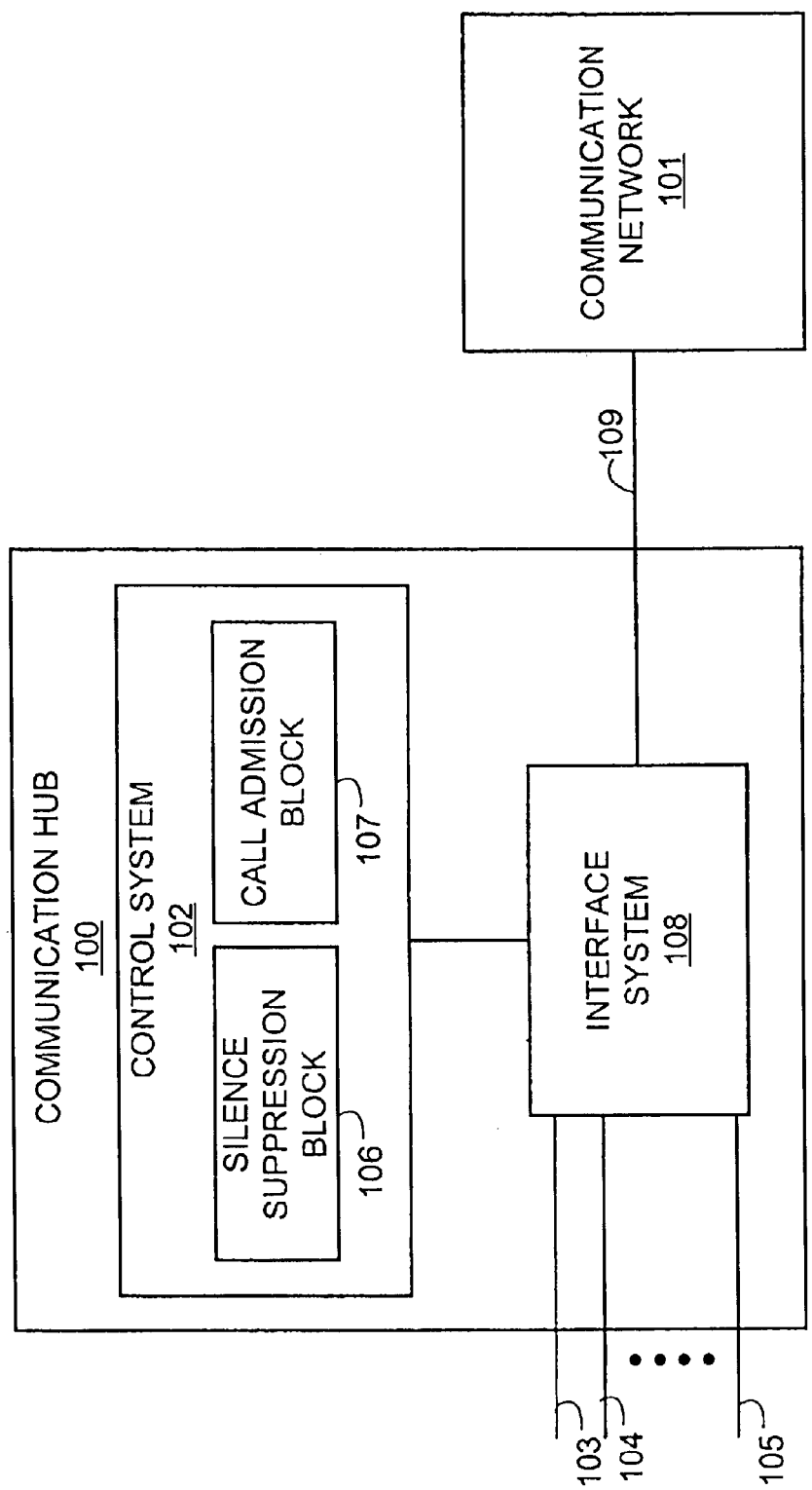
FIG. 1 illustrates a communication hub according to the present invention.
Figure 2:
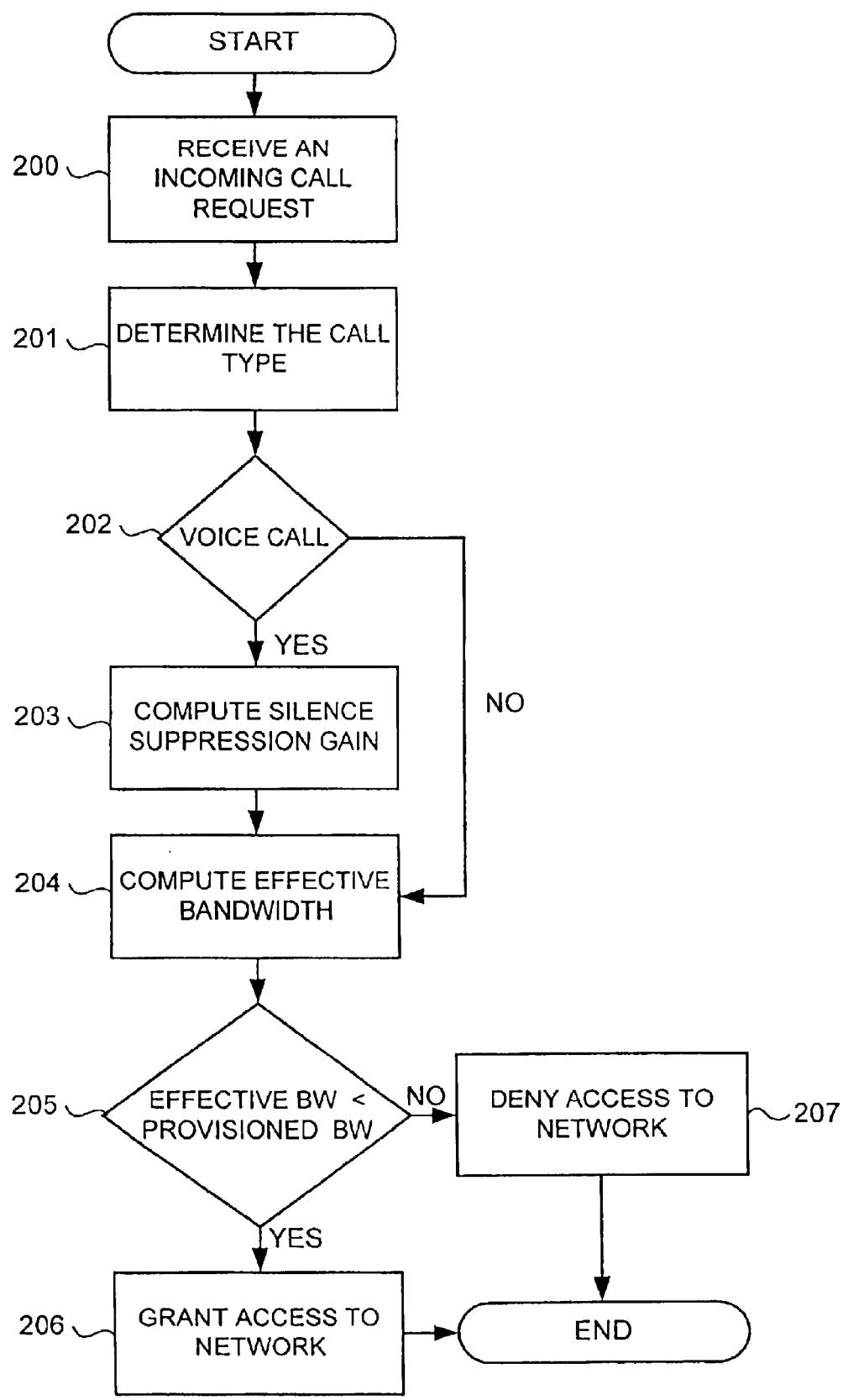
FIG. 2 is a flow chart illustrating the operational steps of a communication hub according to the present invention.

The Communication Hub FIGS. 1–2:

FIG. 1 depicts a communication hub 100, a communication network 101, and communication paths 103, 104, 105, and 109. The communication hub 100 is comprised of a control system 102 and an interface system 108. The control system 102 is comprised of a silence suppression block 106 and a call admission block 107. The interface system 108 is connected to the communication network 101 by communication path 109. The communication path 109 could be any wireless or wireline communication path capable of interfacing with the communication network 101. The interface system 108 is also connected to the control system 102 and the communication paths 103, 104, and 105. The communication paths 103, 104, and 105 could be conventional wireline or wireless communication paths. The interface system 108 could handle numerous other such communication paths, although only communication paths 103, 104, 105, and 109 are shown for clarity. Those skilled in the art will appreciate that the communication hub 100 could include other conventional components not shown on FIG. 1 for clarity. Those skilled in the art will appreciate that the communication hub 100 could include other conventional elements such as voice compression elements to accommodate different coding rates.

The communication network 101 could be any communication network configured to provide audio, video, or data services. Some examples of the communication network 101 include without limitation, a packet network, an internet, and an ethernet. The silence suppression block 106 could be any logic block configured to compute a silence suppression gain for an incoming call based on a silence suppression realized for the incoming call and a number of currently active calls. The call admission block 107 could be any logic block configured to control access to the communication network 101 over the communication path 109 based on the silence suppression gain for the incoming call. The control system 102 could be any device or plurality of devices configured to determine the call type of the incoming call and control the silence suppression block 106 and the call admission block 107. The interface system 108 could be any device or plurality of devices configured to receive the incoming call over one of the communication paths 103, 104, and 105 and exchange call traffic with the communication network 101 over the communication path 109. The interface system 108 could be a conventional voice interface that acts as a POTS interface, supervises signals, channels voice lines, resolves contention between voice lines, or samples, digitizes and compresses analog signals into packets.

FIG. 2 depicts a flow diagram of the operational steps of the communication hub 100. On FIG. 2 an incoming call request is received in the interface system 108 over one of the communication paths 103, 104, and 105 at step 200. The interface system 108 provides the incoming call request to the control system 102. At step 201, the control system 102 determines the call type for the incoming call request. If the call type is a voice call at step 202, processing continues at step 203 and the control system 102 uses the silence suppression block 106 to compute the silence suppression gain based on the silence suppression realized for the incoming call and the number of currently active voice calls. At step 204, the control system 102 uses the call admission block 107 to compute the effective bandwidth required to accommodate the number of currently active calls and the incoming call based on the silence suppression gain. If the effective bandwidth required is less than or equal to the provisioned bandwidth of the communication path 109 at step 205, processing continues at step 206 and the call admission block 107 grants access to the communication network 101 and the call is completed over communication path 109. If the effective bandwidth required is greater than the provisioned bandwidth of the communication path 109 at step 206, processing continues at step 207 and the call admission block 107 denies access to the communication network 101 and the call is rejected.

If the incoming call is a voice-band data call at step 202, processing continues at step 204 and the control system 102 uses the call admission block to compute the effective bandwidth required to accommodate the number of currently active calls and the incoming call. If the effective bandwidth required is less than or equal to the provisioned bandwidth of the communication path 109 at step 205, processing continues at step 206 and the call admission block 107 grants access to the communication network 101 and the call is completed over communication path 109. If the effective bandwidth required is greater than the provisioned bandwidth of the communication path 109 at step 205, processing continues at step 207 and the call admission block 107 denies access to the communication network 101 and the call is rejected. It should be noted that if access to the communication network 101 is granted at step 206, the call is a currently active call and is concurrently active with other currently active calls.

Figure 3:
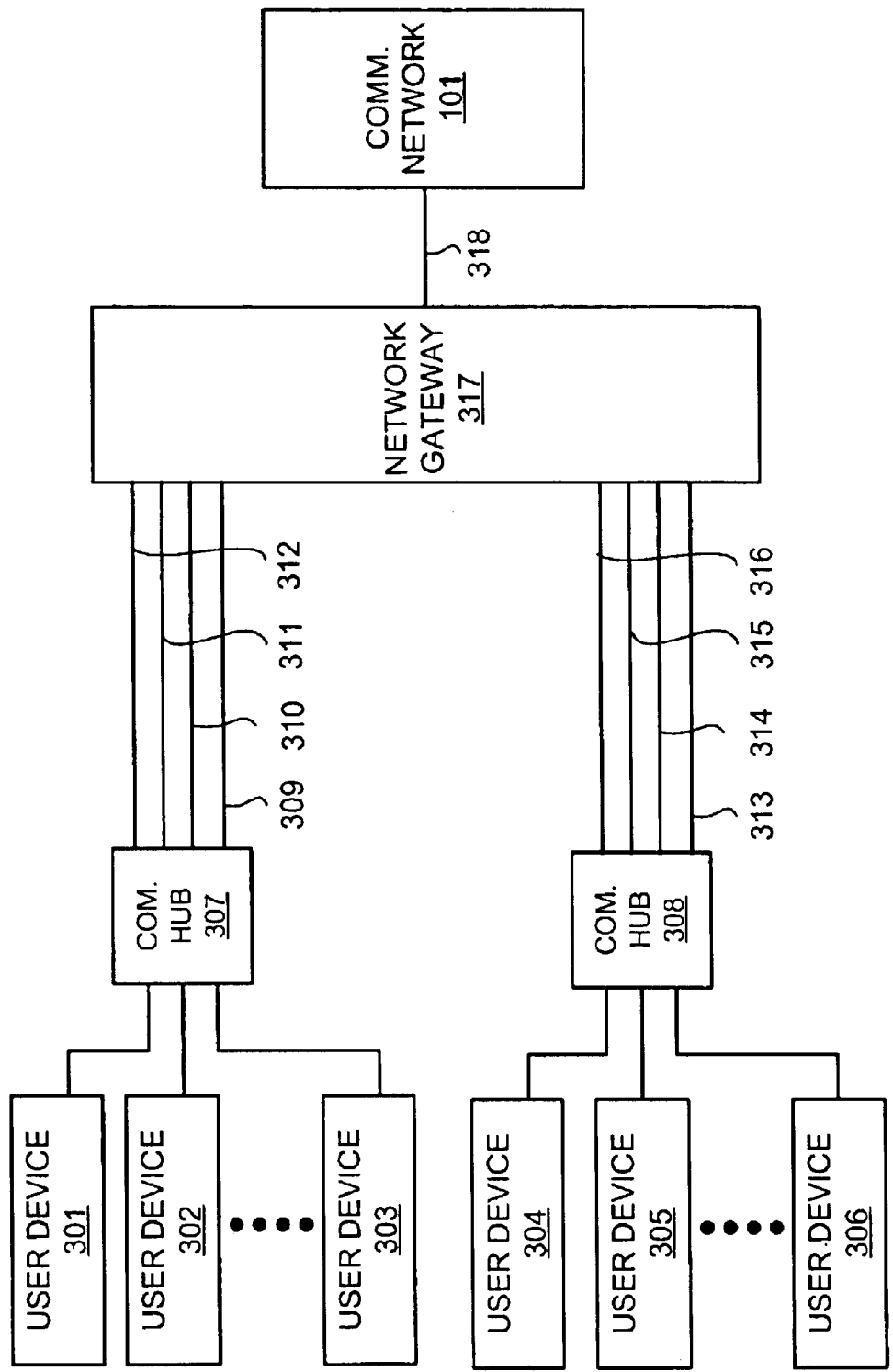
FIG. 3 illustrates a network architecture according to the present invention.

Network Architecture FIG. 3:

FIG. 3 depicts a network architecture in an example according to the present invention. Those skilled in the art will appreciate numerous variations that do not depart from the present invention. Those skilled in the art will also appreciate that various features described-below could be combined with the above described embodiment to form multiple variations of the invention.

FIG. 3 depicts the communication network 101, a network gateway 317, communication hubs 307 and 308, and user devices 301, 302, 303, 304, 305, and 306. The communication hub 307 is connected to the network gateway 317 by communication paths 309, 310, 311, and 312. The communication hub 307 is also connected to the user devices 301, 302, and 303 by conventional voice lines. The communication hub 308 is connected to the network gateway 317 by communications paths 313, 314, 315, and 316. The communication hub 308 is also connected to the user devices 304, 305, and 306 by conventional voice lines. The network gateway 317 is connected to the communication network 101 by communication path 318.

The communication paths 309–316 could be conventional packet connections. Some examples of the communication paths 309–316 include without limitation, voice over internet protocol over asynchronous transfer mode (ATM) and ATM adaptation layer type 2 (AAL2) paths. The communication path 318 could be a conventional network trunk that provides network access and connectivity.

The user devices 301, 302, 303, 304, 305, and 306 could be conventional communication devices that use the analog or digital telephony format. Some examples of user devices 301, 302, 303, 304, 305, and 306 include without limitation, telephones, modems, facsimile machines, computer systems, and video conferencing equipment.

The communication hub 307 could be any device or group of devices configured to receive incoming calls from user devices 301, 302, and 303, and control access to each of the communication paths 309–312 based on silence suppression. The communication hub 308 could be any device or group of devices configured to receive incoming calls from user devices 304, 305, and 306 and control access to each of the communication paths 313–316 based on silence suppression. The network gateway 317 could be a conventional network gateway that provides access to the communication network 101. The network gateway 317 could also be a conventional multiplexer that exchanges communications between communication network 101 and communication hubs 307 and 308. In some examples of the invention, the network gateway 317 could also be configured with the features of the communication hubs 307 and 308 to control access to communication path 318 based on silence suppression.

Call Access Control:

The call admission decision for an incoming call is based on the provisioned bandwidth for a given communication path, e.g. 309, and the effective bandwidth required to accommodate the incoming call and the number of currently active calls over that communication path. The effective bandwidth required is determined by the silence suppression gain realized as a function of the number of superposed voice calls. The silence suppression gain is a discrete non-linear function calculated on a per call basis as a function of the silence suppression gain realized for the incoming voice call with respect to the number of currently active voice calls. For a given mean talkspurt duration, mean silence duration, and packetization time on a single voice source the silence suppression gain factor ($\rho$) is calculated by the following formula:

$$\rho = 1 - \gamma\left(1 - \frac{T}{3f + x}\right)$$

where:

$$f_1 = \left(\frac{x}{n}\right)^2$$

$$f_2 = 2\left[\frac{T^2(1 - (1 + nA)S^n)}{n(n+1)A} + \frac{(1 + n\beta T)S^n T}{n^2 A\beta}\right]$$

$$f = \sqrt{\frac{f_2 - f_1}{n}}$$

$$\gamma = \frac{x}{3f + x}$$

$$X = \frac{T}{A}$$

and where:

$\alpha^{-1}$=the mean talkspurt duration for a single voice source in milliseconds (ms);
$\beta^{-1}$=the mean silence duration for a single voice source in ms; T=the packetization time in ms;
n=the number of superposed voice sources;
A=activity factor, where $$A = \frac{\beta}{\alpha + \beta}$$

S=silence factor, where $$S = \frac{\alpha}{\alpha + \beta}$$

The following is an example to further illustrate the operation of a communication hub according to the present invention, but those skilled in the art will recognize numerous other examples and configurations that are applicable to the invention described above. Those skilled in the art will also appreciate how combinations of features described below can be combined with the above-described embodiment. The following example is described in conjunction with the communication path 309, where the communication path 309 is a T1 connection using VoIP over ATM technology and $\alpha^{-1}$=400 ms, $\beta^{-1}$=600 ms, and T=10 ms.

Table 1 illustrates the silence suppression gain factor ($\rho$) for a given number of voice calls (n).

| n | $\rho_n$ |
|---|---|
| 1 | 0.943 |
| 2 | 0.829 |
| 3 | 0.702 |
| 4 | 0.596 |
| 5 | 0.523 |
| 6 | 0.478 |
| 7 | 0.452 |
| 8 | 0.437 |
| 9 | 0.427 |
| 10 | 0.421 |
| 11 | 0.418 |
| 12 | 0.415 |
| 13 | 0.413 |
| 14 | 0.411 |
| 15 | 0.410 |
| 16 | 0.409 |
| 17 | 0.408 |
| 18 | 0.408 |
| 19 | 0.407 |
| 20 | 0.407 |
| 21 | 0.406 |
| 22 | 0.406 |
| 23 | 0.405 |
| 24 | 0.405 |

At a peak transmission rate of 64 kbps, with an 80 byte packet payload, a 48 byte packet header, having a total of 128 byte packet length, 3 ATM cells are consumed. Thus, the overhead penalty factor (k) is equal to (53*3)/80 and the minimum bandwidth required (B1) for a given number of voice calls (n) is bounded by the formula: B1=64*k*n*p. The bandwidth required (B2) for a given number of voice-band data calls (m) is bounded by the formula: B2=64*k*m.

Table 2 illustrates the effective bandwidth required for a given number of voice calls (n) and a given number of voice band data calls (m) in the lower bound. Those skilled in the art will recognize that an additional five percent (5%) of the total bandwidth, as suggested by RFC1889, could be further allocated for real time conferencing protocol (RTCP) (RTP control protocol) in this example as a matter of design choice.

| n/m | B1n | B2m |
|---|---|---|
| 1 | 119.89 | 127.2 |
| 2 | 210.89 | 254.4 |
| 3 | 267.71 | 381.6 |
| 4 | 303.00 | 508.8 |
| 5 | 332.56 | 636.0 |
| 6 | 365.02 | 763.2 |
| 7 | 402.48 | 890.4 |
| 8 | 444.25 | 1017.6 |
| 9 | 489.11 | 1144.8 |
| 10 | 536.01 | 1272.0 |
| 11 | 584.22 | 1399.2 |
| 12 | 633.24 | 1526.4 |
| 13 | 682.76 | 1653.6 |
| 14 | 732.6 | 1780.8 |
| 15 | 782.65 | 1980.0 |
| 16 | 832.84 | 2035.2 |
| 17 | 883.12 | 2162.4 |
| 18 | 933.47 | 2289.6 |
| 19 | 983.87 | 2416.8 |

-continued

| n/m | B1n | B2m |
|---|---|---|
| 20 | 1034.32 | 2544.0 |
| 21 | 1084.8 | 2671.2 |
| 22 | 1135.31 | 2798.4 |
| 23 | 1185.85 | 2925.6 |
| 24 | 1236.4 | 3052.8 |

The admission decision is based on the total effective bandwidth required (B) for an incoming call and the number of concurrently active voice and voice-band data calls relative to the provisioned bandwidth (B') of the communication path 309. For example, if a customer service agreement allocates a provisioned bandwidth (B') for communication path 309, the admission decision is based on a comparison of (B) to (B'). If (B) is less than or equal to the provisioned bandwidth (B') the call should be admitted. If (B) is greater than or equal to the provisioned bandwidth (B') the call should be denied.

Thus, the number of voice calls (n) and the number voice-band data calls (m) that can be active at any given time dynamically changes subject to the condition that $B' \geq B$, where $B = B1n + B2m$. If this condition is not satisfied the incoming call should be rejected. If this condition is satisfied the incoming call should be admitted. Those skilled in the art will recognize that other factors such as Timer_CU and cell loss ratio (CLR) and algorithms including but not limited to flow-fluid model, and Guassian approximation could be used to compute the effective/equivalent bandwidth, which are application specific, as a matter of design choice.

The above-described communication hub can include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A customer premises communication hub comprising:
   a silence suppression block configured to compute a silence suppression gain in response to an incoming call request, wherein the silence suppression gain is based on the silence suppression realized for the incoming call and a number of currently active calls;
   a call admission block configured to control access to a communication network based on the silence suppression gain for the incoming call request; and
   a control system configured to determine a call type of the incoming call and control the silence suppression block and the call admission block.

2. The communication hub of claim 1 further comprising:
   an interface system configured to receive the incoming call request and exchange call traffic with the communication network over a communication path.

3. The communication hub of claim 1 wherein the call type comprises:
   one of a voice call and a voice-band data call.

4. The communication hub of claim 3 wherein the silence suppression block is configured to compute the silence suppression gain based on a number of currently active voice calls.

5. The communication hub of claim 4 wherein the silence suppression block is further configured to compute the silence suppression gain based on a mean talkspurt duration.

6. The communication hub of claim 4 wherein the silence suppression block is further configured to compute the silence suppression gain based on a mean silence duration.

7. The communication hub of claim 4 wherein the silence suppression block is further configured to compute the silence suppression gain based on a packetization time.

8. The communication hub of claim 4 wherein the silence suppression block is further configured to compute the silence suppression gain based on a number of superposed voice calls.

9. The communication hub of claim 4 wherein the silence suppression block is further configured to compute the silence suppression gain based on an activity factor.

10. The communication hub of claim 4 wherein the silence suppression block is further configured to compute the silence suppression gain based on a silence factor.

11. The communication hub of claim 4 wherein the call admission block is further configured to compute an effective bandwidth for the number of currently active voice calls, a number of currently active voice-band data calls, and the incoming call based on the silence suppression gain.

12. The communication hub of claim 11 wherein the call admission block is further configured to deny access to the communication network if the effective bandwidth is greater than a provisioned bandwidth for the communication path.

13. The communication hub of claim 12 wherein the call admission block is further configured to grant access to the communication network if the effective bandwidth is less than the provisioned bandwidth for the communication path.

14. The communication hub of claim 12 wherein the call admission block is further configured to grant access to the communication network if the effective bandwidth is equal to the provisioned bandwidth for the communication path.

15. A method of operating a customer premises communication hub, the method comprising:
   receiving an incoming call request;
   determining a call type of the incoming call request;
   computing a silence suppression gain, wherein the silence suppression gain is based on the silence suppression realized for the incoming call and a number of currently active calls; and
   controlling access to a communication network based on the silence suppression gain for the incoming call request.

16. The method of claim 15 further comprising:
   computing the silence suppression gain based on a silence factor.

17. The method of claim 15 further comprising:
   computing the silence suppression gain based on a number of superposed voice calls.

18. The method of claim 15 further comprising:
   exchanging call traffic with the communication network over a communication path.

19. The method of claim 15 wherein determining the call type comprises:
   determining if the incoming call request is a voice call request.

20. The method of claim 15 wherein determining the call type comprises:
determining if the incoming call request is a voice-band data call request.

21. The method of claim 15 further comprising:
computing the silence suppression gain based on a number of currently active voice calls.

22. The method of claim 15 further comprising:
computing the silence suppression gain based on a mean talkspurt duration.

23. The method of claim 15 further comprising:
computing the silence suppression gain based on a mean silence duration.

24. The method of claim 15 further comprising:
computing the silence suppression gain based on a packetization time.

25. The method of claim 15 further comprising:
computing the silence suppression gain based on an activity factor.

26. The method of claim 21 further comprising:
computing an effective bandwidth for the number of currently active voice calls, a number of currently active voice-band data calls, and the incoming call request based on the silence suppression gain.

27. The method of claim 26 wherein controlling access to the communication network comprises:
denying access to the communication network if the effective bandwidth is greater than a provisioned bandwidth for the communication path.

28. The method of claim 27 wherein controlling access to the communication network comprises:
granting access to the communication network if the effective bandwidth is less than the provisioned bandwidth for the communication path.

29. The method of claim 27 wherein controlling access to the communication network comprises:
granting access to the communication network if the effective bandwidth is equal to the provisioned bandwidth for the communication path.

30. A software product for a customer premises communication hub, the software product comprising:
communication software operational when executed by a processor to direct the processor to compute a silence suppression gain in response to an incoming call request, wherein the silence suppression gain is based on the silence suppression realized for the incoming call and a number of currently active calls, and control access to a communication network based on the silence suppression gain for the incoming call request; and
a software storage medium operational to store the communication software.

31. The software product of claim 30 wherein the communication software is operational when executed by the processor to direct the processor to:
compute the silence suppression gain based on a packetization time.

32. The software product of claim 30 wherein the communication software is operational when executed by the processor to direct the processor to:
compute the silence suppression gain based on a number of superposed voice calls.

33. The software product of claim 30 wherein the communication software is operational when executed by the processor to direct the processor to:
compute the silence suppression gain based on an activity factor.

34. The software product of claim 30 wherein the communication software is operational when executed by the processor to direct the processor to:
compute the silence suppression gain based on a silence factor.

35. The software product of claim 30 wherein the communication software is operational when executed by the processor to direct the processor to:
receive the incoming call request and exchange call traffic with the communication network over a communication path.

36. The software product of claim 30 wherein the communication software is operational when executed by the processor to direct the processor to:
compute the silence suppression gain based on a number of currently active voice calls.

37. The software product of claim 30 wherein the communication software is operational when executed by the processor to direct the processor to:
compute the silence suppression gain based on a mean talkspurt duration.

38. The software product of claim 30 wherein the communication software is operational when executed by the processor to direct the processor to:
compute the silence suppression gain based on a mean silence duration.

39. The software product of claim 36 wherein the communication software is operational when executed by the processor to direct the processor to:
compute an effective bandwidth for the number of currently active voice calls, a number of currently active voice-band data calls, and the incoming call based on the silence suppression gain.

40. The software product of claim 39 wherein the communication software is operational when executed by the processor to direct the processor to:
deny access to the communication network if the effective bandwidth is greater than a provisioned bandwidth for the communication path.

41. The software product of claim 40 wherein the communication software is operational when executed by the processor to direct the processor to:
grant access to the communication network if the effective bandwidth is less than the provisioned bandwidth for the communication path.

42. The software product of claim 40 wherein the communication software is operational when executed by the processor to direct the processor to:
grant access to the communication network if the required bandwidth is equal to the provisioned bandwidth for the communication path.

* * * * *